(12) United States Patent
Sullivan et al.

(10) Patent No.: US 9,574,741 B2
(45) Date of Patent: Feb. 21, 2017

(54) LASER PROTECTIVE DEVICE WITH REFLECTING FILTER ON NON-ABSORBING AND ABSORBING SUBSTRATES

(71) Applicant: Iridian Spectral Technologies, Ltd., Ottawa (CA)

(72) Inventors: Brian Thomas Sullivan, Ottawa (CA); Graham Carlow, Ottawa (CA); Norman Ronald Osborne, Ottawa (CA); Adam Badeen, Ottawa (CA); Jason Palidwar, Kanata (CA)

(73) Assignee: Iridian Spectral Technologies, Ltd. (CA)

( * ) Notice: Subject to any disclaimer, the term of this patent is extended or adjusted under 35 U.S.C. 154(b) by 200 days.

(21) Appl. No.: 14/501,291

(22) Filed: Sep. 30, 2014

(65) Prior Publication Data

US 2015/0092053 A1    Apr. 2, 2015

Related U.S. Application Data

(60) Provisional application No. 61/885,116, filed on Oct. 1, 2013.

(30) Foreign Application Priority Data

Oct. 1, 2013    (CA) ...................................... 2828687

(51) Int. Cl.
*F21V 7/00*    (2006.01)
*G02C 7/10*    (2006.01)
(Continued)

(52) U.S. Cl.
CPC ............... *F21V 7/0066* (2013.01); *F21V 9/06* (2013.01); *G02B 5/26* (2013.01); *G02B 5/28* (2013.01); *G02C 7/104* (2013.01)

(58) Field of Classification Search
CPC ............ F21V 7/0066; F21V 9/06; G02B 5/26; G02B 5/28; G02C 7/104
(Continued)

(56) References Cited

U.S. PATENT DOCUMENTS 5,005,926 A * 4/1991 Spielberger ............ G02B 5/285
359/359
5,966,240 A 10/1999 Lange et al.
(Continued)

FOREIGN PATENT DOCUMENTS

JP    2005062238 A    3/2005

OTHER PUBLICATIONS

Canada: Iridian Announces New Anti-laser Protection Glasses, Jun. 25, 2013, Web Feb. 9, 2015, <http://www.laserpointersafety.com/news/news/other-news_files/f070b6d15f32f14588a8759456c934cf-321.php>.

*Primary Examiner* — Bumsuk Won
*Assistant Examiner* — Grant Gagnon
(74) *Attorney, Agent, or Firm* — Laubscher, Spendlove & Laubscher, P.C.

(57) ABSTRACT

A laser reflecting has a low transmittance at one or more laser wavelengths while substantially transmitting all other wavelengths in the spectral range of interest, is coated on one or both sides of an absorbing or non-absorbing substrate. A laser reflecting filter on both sides of an absorbing substrate can result in an enhancement of the absorption of laser light by multiple reflections of the laser light in the absorbing substrate. The high transmittance of the laser-reflecting filter at non-laser wavelengths results in a relatively high overall transmittance through the coated substrate. In the specific case of laser reflecting coatings on a lens to protect an eye, this allows a high luminous transmittance and good color discrimination.

15 Claims, 8 Drawing Sheets

(51) Int. Cl.
*F21V 9/06* (2006.01)
*G02B 5/26* (2006.01)
*G02B 5/28* (2006.01)

(58) Field of Classification Search
USPC .............................. 351/44; 348/143; 362/341
See application file for complete search history.

(56) References Cited

U.S. PATENT DOCUMENTS

| | | | |
|---|---|---|---|
| 6,076,932 A * | 6/2000 | Uchida | G02B 5/22 |
| | | | 359/585 |
| 2010/0128356 A1 | 5/2010 | Feklistov | |
| 2013/0278893 A1* | 10/2013 | Lemay | A61F 9/022 |
| | | | 351/159.57 |
| 2014/0233105 A1* | 8/2014 | Schmeder | G01J 3/465 |
| | | | 359/590 |
| 2014/0268031 A1* | 9/2014 | Ambler | G02C 7/104 |
| | | | 351/159.64 |
| 2014/0300857 A1* | 10/2014 | Cohen-Tannoudji | G02C 7/104 |
| | | | 351/159.63 |

* cited by examiner

LASER PROTECTIVE DEVICE WITH REFLECTING FILTER ON NON-ABSORBING AND ABSORBING SUBSTRATES

CROSS REFERENCE TO RELATED APPLICATION

This application claims the benefit under 35 USC 119 (e) of U.S. Provisional Application No. 61/885,116 filed Oct. 1, 2013 and Canadian Patent Application No. 2,828,687 filed Oct. 1, 2013, the contents of which are herein incorporated by reference.

FIELD OF THE INVENTION

This invention relates to the field of laser protective devices, and in particular to a protective device with filter for protecting the eyes or devices, such as surveillance cameras, from harmful laser light.

BACKGROUND OF THE INVENTION

High power lasers can inflict damage to an eye or a device if the light from the laser is intentionally or accidentally directed to an unprotected eye or device. As one example, airline and helicopter pilots have reported laser strikes where laser pointers are aimed at their cockpits. These laser strikes can cause a significant glare hazard through dazzle which makes it very difficult to see cockpit instrumentation or see outside the cockpit. Additionally, the laser might strike a pilot's eyes directly causing temporary or permanent blindness. As another example, a person may be working with a high power laser that has the potential to cause significant eye damage if the laser light is accidentally directed to their eyes or others present in the same proximity to the high power laser. As yet another example, a surveillance camera in a high security location may be accidently or intentionally disabled using a high power laser.

One prior approach to protect eyes from laser light is to employ absorbing substrates or lenses, typically based on dyes introduced into glass or plastic substrate material which are formulated to provide some blocking at one or more laser wavelengths through absorption. With this approach, a significant blocking from optical density (OD) of OD1 to OD7 or higher can be achieved at one or more laser wavelengths. The absorption of light does not depend on the angle of which the laser light is incident upon the substrate. However, the disadvantage of these dyes is that they are not particularly wavelength selective. Hence, absorbing lenses can undesirably block a significant portion of the visible spectrum resulting in a low luminance or photoptic transmittance through the lens. As well, there can be a poor colour discrimination in these absorbing substrates which can prohibit their use. In addition, the absorption material may break down after absorbing a high intensity of light; hence, the blocking may be substantially degraded and not provide the same laser blocking protection.

Thus, there is a need for eye protection glasses that provides good optical blocking at one or more specified laser wavelengths, good luminance transmittance and colour discrimination and a reduced reflection of ambient (or laser) light back into a user's eye off the backside of a lens. There is also a need for optical filters to protect devices such as surveillance cameras from being functionally impaired by high power lasers.

SUMMARY OF THE INVENTION

According to the present invention there is provided a laser protective device, comprising a transparent substrate; and a reflecting filter deposited on one or both sides of the transparent substrate configured to substantially reflect one or more laser wavelengths while substantially transmitting most non-laser wavelengths in a spectral range of interest.

The substrate should be at least partially transparent for the wavelengths of interest. In one embodiment it may be absorbing at laser wavelengths. Also, in some embodiments it may be desirable to make the substrate provide good colour discrimination, including good orange/yellow discrimination. In advantageous embodiments the substrate is be absorbing at one or more of the laser wavelengths. In these embodiments the substrate absorption minimizes the intensity of laser light that reaches an eye or a device.

The spectral range of interest depends on the spectrum used by the protected user or device. For example, in the case of eyeglasses, it is generally the visible spectrum, namely 380 nm to 780 nm although other wavelengths can affect a user's vision; for a device such as a camera with a Si-based light sensor, it would generally be a spectral range from 200 nm to 1200 nm.

The laser protective device can be in the form of eyeglasses or an eyeshade, generally referred to as eyewear, worn by the user. The transparent substrate forms a viewing window, which in the case of eyeglasses, would be the lenses. In the case of an eyeshade, the viewing window would be in the form of a screen. Such a device is useful for pilots or persons working in the vicinity of high-powered lasers. Alternatively, it can be in the form of a lens or filter adapted to be placed over a surveillance camera or other device in need of protection.

One of the characteristics of commercial high power lasers is that they emit light at known wavelengths with narrow line widths. For example, typical wavelengths of commercially available lasers are: 405 nm, 445 nm, 532 nm, 635 nm, 650 nm, 808 nm and 1064 nm although more wavelengths exist. It is therefore possible in accordance with the teachings of the invention to filter out one or more of these wavelengths while allowing most of the spectrum to pass unhindered. This means that the protective device will have minimum impact on the normal operation of the protected user or device; for example, pilots operating in a low ambient light environment will not have reduced vision. Surveillance cameras will still be able to operate normally with good colour discrimination.

In accordance with embodiments of the invention a laser reflecting filter is coated on one or both sides of an absorbing or non-absorbing substrate. The laser reflecting filters are designed to have a substantial reflectance at one or more specified laser wavelengths and, most importantly, a substantial transmittance at other wavelengths in the spectral range of interest. In addition, the laser reflecting filter is designed such that it provides good colour discrimination (i.e., the ability to allow the one to distinguish between different colours of light). That is, the reflectance band of laser light can be narrow in wavelength so that primarily only the laser light is reflected, over a given angle of incidence. The high substantial reflectance of the laser reflecting filter or filters, at the one or more laser wavelengths, minimizes the intensity of laser light that reaches an eye or a device. In addition, if an absorbing substrate is used, where there is substantial absorption at one or more laser wavelengths, then the substrate absorption minimizes the intensity of laser light that reaches an eye or a device.

In one preferred embodiment, a laser reflecting filter is coated on one or both sides of an absorbing or non-absorbing substrate to protect a device from having its functionality impaired by one or more high power lasers. In another preferred embodiment, a laser reflecting filter is coated on one or both sides of a non-absorbing lens to minimize high power laser light from reaching an eye. In yet another embodiment, a laser reflecting filter is coated on one side of an absorbing lens to minimize high power laser light from reaching an eye through both the substantial reflectance in the laser reflecting filter and the substantial absorption in the absorbing lens.

In another embodiment, one laser reflecting filter is coated on one side of an absorbing lens and the same or different laser reflecting mirror is coated on the opposite side of the said absorbing lens; the two laser reflecting mirrors can create an enhanced absorption through the multiple passes of the laser light through the absorbing lens; this enhanced absorption is able to further minimize high power laser light from reaching an eye. In addition, the laser reflecting filter with the lowest overall reflectance can be placed on the lens surface closest to the user's eye to minimize any ambient or laser light reflected directly off the lens surface closest to the eye.

In all of these above embodiments, the substantial transmittance of the coated substrate allows a relatively high overall transmittance of non-laser wavelength light over the spectral range of interest. For coated lenses used to protect an eye from high power lasers, this allows a user to wear the coated lenses in different ambient light conditions and still be able to carry out their duties (i.e., airline cockpit at night).

In yet another preferred embodiment, in strong daylight conditions, a user may prefer a darker lens that provides UVA/UVB eye protection and decreases the amount of light entering the eye (i.e., sunglasses). In this embodiment, the laser reflecting filter is coated on one of both sides of a sunglasses to minimize high power laser light from reaching an eye through the substantial reflectance in the laser reflecting filter while simultaneously providing protection against UVA/UVB light and reducing the total amount of visible light reaching the user's eye.

BRIEF DESCRIPTION OF THE DRAWINGS

The invention will now be described in more detail, by way of example only, with reference to the accompanying drawings, in which:—

DETAILED DESCRIPTION OF EMBODIMENTS OF THE INVENTION

The following terms have the meanings as herein defined:

Substantially Blocked: Transmittance of light is typically less than 1%.

Substantially Transmitted: Transmittance of light is typically greater than 50%.

Substantially Reflected: Reflectance of light is typically greater than 50%.

Substantially Absorbed: Absorption of light is typically greater than 50%.

High Power laser light: laser light with an intensity high enough that it is sufficient to harm or impair either i) an eye or ii) a device (such as a surveillance camera) by destroying a light image sensor.

Non-absorbing substrate: a substrate that substantially transmits most wavelengths of light over the wavelength region of interest. As an example, for an eye a non-absorbing substrate is one that substantially transmits most of the visible spectrum region from 380 nm to 780 nm; for a device such as a camera with a Si-based light sensor, a non-absorbing substrate is one that substantially transmits most of the wavelengths over the spectral range from 200 nm to 1200 nm. Some devices may have an optical filter that restricts the detection to only visible light.

Absorbing substrate: a substrate that has substantial absorption at one or more wavelengths but substantially transmits other wavelengths of light over the wavelength region of interest. As an example, for an eye an absorbing substrate may have high absorption in the 510-550 nm range but high transmittance elsewhere in the visible spectrum from 380 nm to 780 nm; for a device such as a camera with a Si-based light sensor, an absorbing substrate may be one that has substantially high absorption from 800 to 1200 nm but substantially transmits wavelengths over the spectral range from 200 nm to 750 nm.

Optical Coating or Optical Filter: a thin film filter that uses the principle of optical interference to transmit, reflect or absorb different wavelengths of light over a spectral range of interest. A thin film filter typically consists of a series of thin film layers: the thicknesses of the layers can typically vary from 0.1 nm to more than 10000 nm and the refractive index of the layer materials can typically vary from 1.2 to 5.0. In addition, some materials may also have some absorption over the wavelength region of interest (with an extinction coefficient typically varying from $1.0 \times 10^{-8}$ to 30.0). To obtain a desired spectral performance (where the transmittance, reflectance or absorption vary in a specified way across a wavelength region of interest), the number of layers, the layer thicknesses, and the materials in an optical coating are optimized—this is a known practice to those skilled in the arts. Typically, an optical coating will consist of alternating layers of a low and high index material with low absorption in the spectral range of interest. Typical low index materials are, but not limited to, $SiO_2$, $SiO$, $MgF_2$, $CaF_2$. Typical high index materials are, but not limited to, $Ta_2O_5$, $Nb_2O_5$, $Al_2O_3$, $SiN$, $TiO_2$, $Si$, $Ge$. These materials can be deposited using a number of different deposition methods including physical vapour deposition, chemical vapour deposition, sol-gel deposition. The method of designing the optical coatings and the deposition method used to deposit the coatings is not relevant. An excellent overall reference to the field of optical coatings is Angus Macleod's "Optical Thin Film Filters" book (4$^{th}$ Edition, 2012), the contents of which are herein incorporated by reference.

Laser Reflecting Filter: an optical filter that is designed to substantially reflect one or more laser lines (at different wavelengths) while substantially transmitting most of the non-laser wavelengths of interest. As an example, for an eye, the visible wavelength region from 380 nm to 780 nm should be substantially transmitted except for undesired laser wavelengths; for a device such as a camera using a Si-based light sensor, the spectral range from 200 nm to 1200 nm should be substantially transmitted, although a device may incorporate other optical filters to restrict the range of wavelengths that are detected; i.e., to only detect the visible wavelength range. In addition, there may be one or more absorbing materials in a laser reflecting filter so that there is also some absorption at one or more laser lines. Such a reflecting filter acts as a laser blocking filter that minimizes transmittance of laser light through the filter either through reflection alone in the filter or through a combination of reflection and absorption in the filter. In addition, absorbing materials may be used in laser reflecting filters to provide a neutral attenuation of light for laser protection devices intended to be used in strong daylight conditions.

Coated Substrate or Coated Lens: An absorbing or non-absorbing substrate (lens) that has a laser reflecting filter coated on one or both sides of the said substrate (lens). The substrate can be made of a glass material, a plastic material (such as polycarbonate, CR39, . . . ), a semiconductor material or any other suitable material.

Transparent substrate: A substrate that is transparent to wavelengths of interest to an eye or device. It may be absorbing at certain wavelengths.

Colour Discrimination: For some applications, it is important when viewing through an optical coating to be able to discriminate between different colours (i.e., orange and yellow). The amount of colour discrimination can be modelled in an optical coating (using CIE colour coordinates)—there is usually a tradeoff between the colour discrimination and other desired filter optical properties.

Laser wavelengths: Wavelengths associated with high intensity lasers. Such wavelengths include, but are not limited to, 405 nm, 445 nm, 532 nm, 635 nm, 650 nm, 808 nm and 1064 nm.

In accordance with embodiments of the invention, a laser reflecting filter (12) and (14) in the form of an optical coating is coated on one or both sides of a non-absorbing (10) or absorbing substrate (16) as depicted in FIGS. 1 to 4. The laser reflecting filters (12) and (14) are designed to have a substantial reflectance at one or more specified laser wavelengths and, most importantly, a substantial transmittance at other wavelengths in the spectral range of interest. That is, for an optical filter, the reflectance band of laser light can be narrow in wavelength so that only the laser light is reflected, over a given angle of incidence, and other wavelengths are substantially transmitted, although it will be appreciated that in strong daylight conditions it may also be useful to have some attenuation of visible light. E.g. the protective device could be in the form of sunglasses with the additional protective coatings provided by the invention. The high substantial reflectance of the laser reflecting filter or filters, at the one or more laser wavelengths, reduces the intensity of laser light that reaches an eye or a device. In addition, if an absorbing substrate (16) is coated with one or more laser reflecting filters (12) and (14), then the substantial absorption at one or more laser wavelengths in the said absorbing substrate contributes to a further reduction of laser light reaching an eye or a device.

In all of the following embodiments, the substantial transmittance of the coated substrate (depicted in FIGS. 1 to 4) allows a relatively high overall transmittance of non-laser wavelength light over the spectral range of interest to ensure minimum impact on the operation of the protected user or device. For coated lenses used to protect an eye from high power lasers, this allows a user to wear the coated lenses in different ambient light conditions and still be able to carry out their duties (i.e., airline cockpit at night). Similarly, a coated substrate used to protect a device from high power lasers, allows a device such as a surveillance camera to view, monitor or record a scene.

Note that while the substrates (10) and (16) are depicted in FIGS. 1 to 4 as having parallel sides, in practice they can have parallel sides or non-parallel sides and the sides of the substrates can have a positive or negative radius of curvature varying from 20 mm up to infinity (flat surface) and the curvatures on the two surfaces may be different.

The laser reflecting filters used in the following embodiments are based on thin film optical interference so that there is a wavelength shift in the spectral features of the laser reflecting filter as the angle of light incident upon the laser reflecting filter is changed. This spectral wavelength change has to be taken into account when designing the laser reflecting filter but this is well-known to those practised in the art of designing and manufacturing optical filters. In addition, the laser reflecting filter can also incorporate materials that are substantially absorbing over part or all of the wavelength range of interest. In this case, the laser reflecting filter can not only substantially reflect laser light but it can also substantially absorb laser light as well.

In one preferred embodiment, a novel application is to use a laser reflecting filter coated on one or both sides, (12) and (14), of a non-absorbing (10) or absorbing (16) substrate to protect an eye or device, such as a surveillance camera, from having its functionality impaired by light from one or more high power lasers. In particular, the said laser reflected coated substrate is placed in front of a device in order to substantially reduce the intensity of laser light incident upon the device so that the functionality of the said device is not impaired. The said laser reflecting filter (12) and (14) are optical filters designed to substantially reflect one or more laser lines while substantially transmitting most of the non-laser wavelengths of interest for the said device. If an absorptive material is used in (12) or (14), then the laser reflecting coatings can have a substantial absorption at one or more laser lines while substantially transmitting most of the non-laser wavelengths of interest for the said device. In particular, the said device can be a surveillance camera used to view or monitor a scene or record images of a scene either continuously or intermittently. If the said substrate (16) is substantially absorbing at one or more laser wavelengths while being substantially transmitting over the spectral range of interest of the device, then the said coated substrate further minimizes the intensity of laser light incident upon the said device to be protected.

Figure 5:
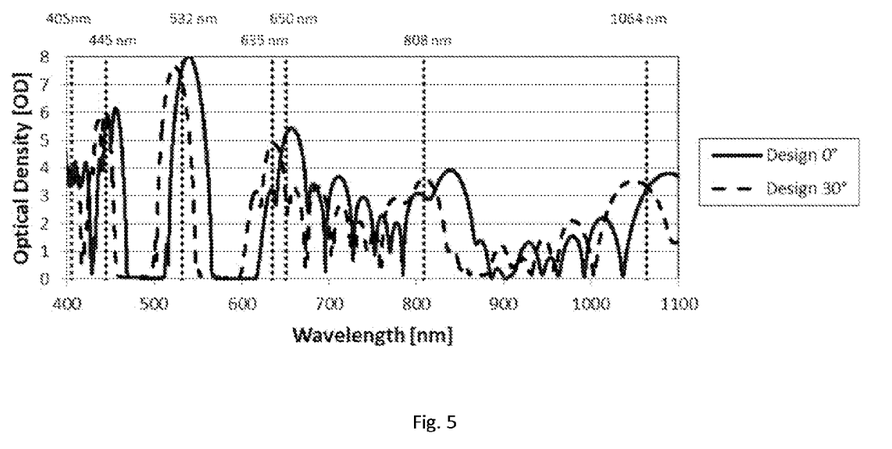
FIG. 5 shows the optical density (OD) plotted against wavelength for a non-absorbing lens with a laser reflecting filter that has substantial high reflectance at the laser wavelengths of 405, 445, 532, 635, 650, 808 and 1064 nm, for an angular field of view of 30° and having substantial transmittance in the visible spectrum from 400 to 700 nm.

Typical laser lines that are common and have a high intensity include, but are not limited to, the following wavelengths: 405 nm, 445 nm, 532 nm, 635 nm, 650 nm, 808 nm and 1064 nm. FIG. 5 shows the theoretical transmittance of a laser reflecting coating, deposited on a non-absorbing substrate, designed to have substantial reflectance at the wavelengths of 405 nm, 445 nm, 532 nm, 635 nm, 650 nm, 808 nm and 1064 nm, using the configuration depicted in FIG. 1, over an angular field of view of 0° and 30°. Laser lines at these said wavelengths will have a have a substantial reflectance if they are incident upon the coated substrate at angles of incidence between 0° and 30°. In this figure, the transmittance is shown as optical density (OD) which is equivalent to −Log 10(transmittance). The wavelength shift between the 0° and 30° angles of incidence, as shown in FIG. 5, is typical of optical interference coatings and needs to be taken into account in the design of the laser reflecting coating.

There is a substantial transmittance of the said laser reflected coating depicted in FIG. 5 at wavelengths between 400 and 700 nm other than the laser wavelength bands.

In another embodiment, a laser reflecting filter is coated on one or both sides, (12) and (14), of a non-absorbing (10) substrate to protect a user's eye from having its functionality impaired by light from one or more high power lasers. In the case of a user wearing glasses or an eyeshade, the substrate is typically shaped as a lens which typically has a spherical radius of curvature of 20 to 200 mm for both surfaces of the lens. In particular, the laser reflected coated lens is placed in front of a user's eye in order to substantially minimize the intensity of laser light incident upon the device so that the functionality of the said user's eye is not impaired. The laser reflecting filter (12) and (14) are optical filters designed to substantially reflect one or more laser lines while substantially transmitting most of the non-laser wavelengths in the visible spectrum from around 380 nm to around 780 nm. The laser reflecting filter can be deposited on one surface of the lens only. If there are a large number of laser lines to be blocked, a second laser reflecting filter can be deposited on the opposite surface of the lens where the same or different set of laser lines may be targeted to be substantially reflected. As for the previous embodiment, typical laser lines that are common and have a high intensity include, but are not limited to, the following wavelengths of 405 nm, 445 nm, 532 nm, 635 nm, 650 nm, 808 nm and 1064 nm. For some applications, it is required that the substrate be made of a plastic material, such as a polycarbonate, in order to have it pass an impact projectile test and possibly also for lighter weight compared to a glass substrate.

There can be a problem with ambient light or laser light incident upon the backside of a coated lens which can then be reflected directly towards a user's eye. This can result in a distracting glare and a reduced contrast. One method to reduce the backside reflection of the coated lens is to limit the amount of ambient light that can reach the backside of the side. This can be accomplished by constructing the frames holding the lens in such a manner as to substantially block out most of the ambient light. Another approach is to have a laser reflecting filter deposited on at least the side closest to the user's eye, where the said laser reflecting filter has one or more absorbing layers present. This will have the effect of minimizing the reflection of ambient light to the user's eye by absorption in the laser reflecting filter. Note that this can impact on the substantial transmittance of non-laser wavelengths so that there is a trade-off in the overall transmittance of the coated lens and the amount of ambient light that can be reflected off the backside of a lens into a user's eye. Note that these approaches can be used for all further embodiments of laser reflectance filters deposited on absorbing filters.

Figure 1:
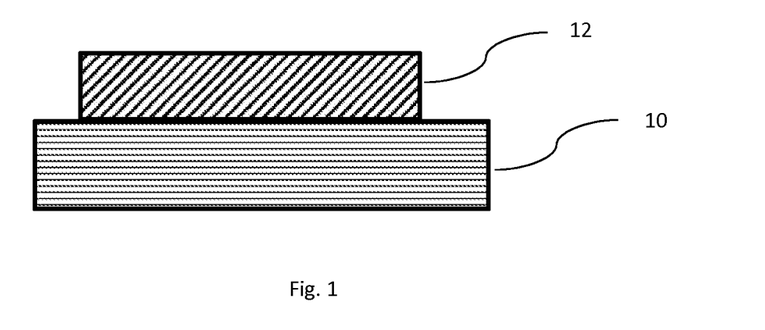
FIG. 1 shows a laser reflecting filter deposited on one side of a non-absorbing substrate.
Figure 2:
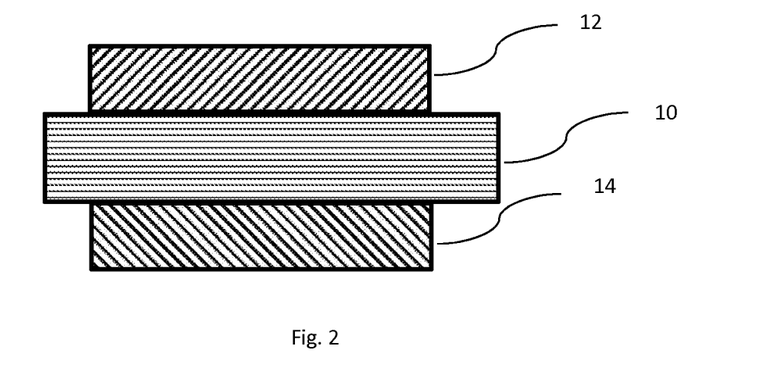
FIG. 2 shows a laser reflecting filter deposited on one side of a non-absorbing substrate and a second laser reflecting filter deposited on the opposite side of a non-absorbing substrate.
Figure 3:
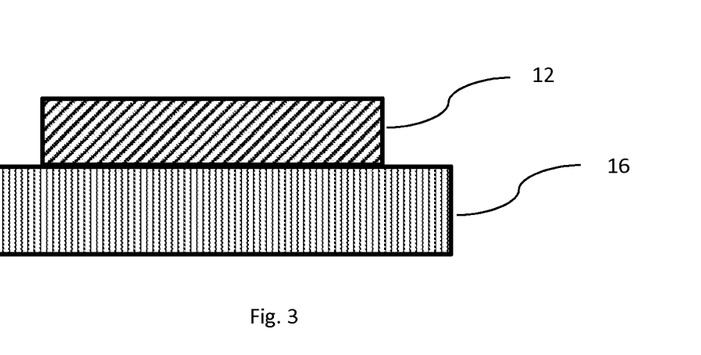
FIG. 3 shows a laser reflecting filter deposited on one side of an absorbing substrate.

In yet another embodiment, a laser reflecting filter (12) is coated on one side of an absorbing substrate (16), as depicted in FIG. 3, to reduce high power laser light from reaching an eye through both the substantial reflectance in the laser reflecting filter and the substantial absorption in the absorbing lens. In the case of a user wearing glasses or an eyeshade, the substrate is typically shaped as a lens which typically has a spherical radius of curvature of 20 to 200 mm for both surfaces of the lens. A substantial radius of curvature, typically less than 200 mm, is also useful in this regard as it causes any reflected beam to diverge and linearly decreases the power density of the reflected beam with distance. In particular, a laser reflecting filter is deposited on one side only of an absorbing lens wherein the said coated lens is placed in front of a user's eye in order to substantially reduce the intensity of laser light incident upon the eye so that the functionality of the eye is not impaired, wherein the said laser reflecting filter is an optical filter designed to substantially reflect one or more laser lines while substantially transmitting most of the non-laser wavelengths in the visible spectrum from around 380 nm to around 780 nm, wherein the said absorbing substrate substantially absorbs light at one or more laser line wavelengths while substantially transmitting most of the non-laser wavelengths in the visible spectrum from around 380 nm to around 780 nm. The said laser reflecting filter is designed to substantially reflect laser light centered at or around, but not restricted to, one or more of the following wavelengths of 405 nm, 445 nm, 532 nm, 635 nm, 650 nm, 808 nm and 1064 nm while the said absorbing lens substantially absorbs laser light centered at or around, but not restricted to, one or more of the following wavelengths of 405 nm, 445 nm, 532 nm, 635 nm, 650 nm, 808 nm and 1064 nm. In addition, the coated absorbing lens can be oriented such that the laser reflecting filter is deposited on the side of the said absorbing lens closest to the user's eye in order to substantially reflect the said incident laser light wavelengths and have this reflected light pass through the absorbing substrate a second time in order to minimize the total intensity of laser light that is reflected away from the coated absorbing substrate. This helps to ensure that the intensity of the total reflected laser light off the said coated absorbing lens will be minimized to avoid harming the eyes of nearby people. For some applications, it is required that the substrate be made of a plastic material, such as a polycarbonate, in order to have it pass an impact projectile test and possibly also for lighter weight compared to a glass substrate.

Figure 6:
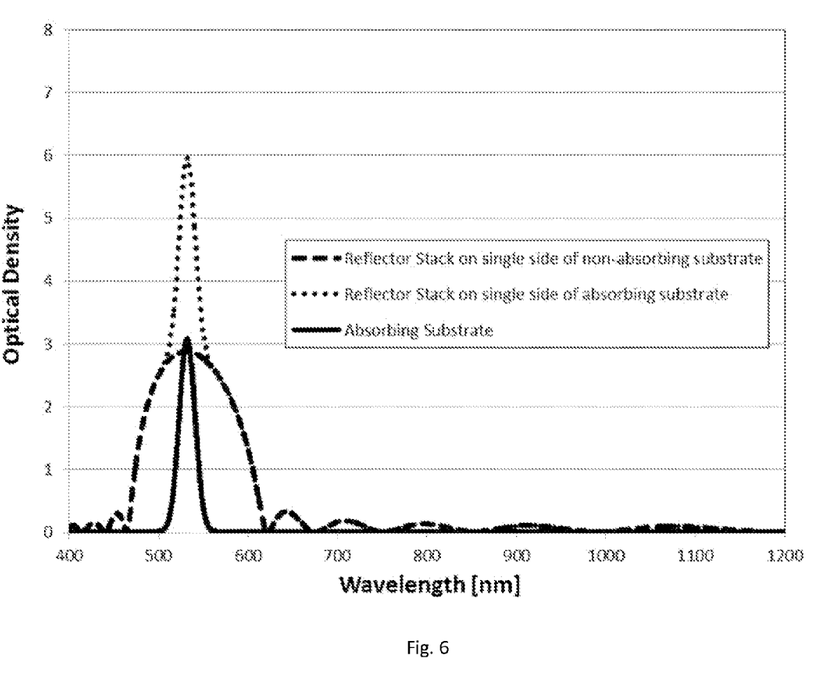
FIG. 6 shows the OD plotted against wavelength for a non-coated absorbing lens with a high absorption at 532 nm (solid line), and the same absorbing lens with a laser reflecting filter coated on one surface (dotted line) and the same laser reflecting filter coated on a non-absorbing lens (dashed line).

FIG. 6 shows an example of the embodiment of a laser reflecting filter deposited on an absorbing substrate whose structure corresponds to that depicted in FIG. 3. In this figure, at ~532 nm, the laser reflecting filter on a non-absorbing substrate reflects the laser light so that the incident laser light is blocked to a level of 2.8 OD (dashed line). At the same wavelength, the absorbing substrate (without a laser reflecting filter coated on the substrate) absorbs the laser light so that the incident laser light is blocked to a level of 3.1 OD (solid line). At the same wavelength, the absorbing substrate with the said laser reflecting filter both absorbs and reflects the laser light so that the incident light is blocked to a level of 5.9 OD (dotted line). This clearly demonstrates the additive blocking properties of the absorbing substrate and a single laser reflecting filters coated on one side of the absorbing substrate.

Figure 4:
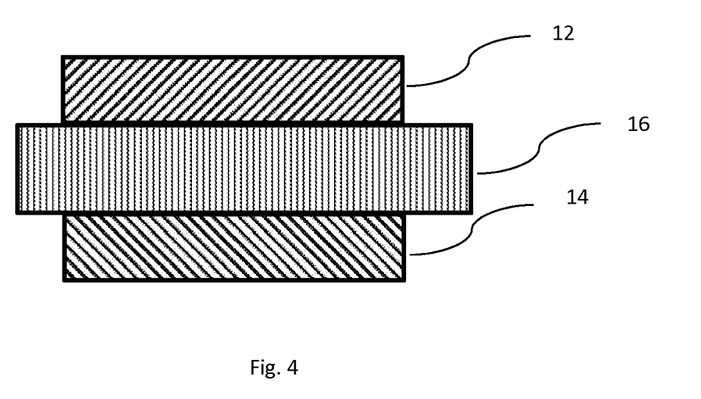
FIG. 4 shows a laser reflecting filter deposited on one side of an absorbing substrate and a second laser reflecting filter deposited on the opposite side of the non-absorbing substrate.

In yet another preferred embodiment, a laser reflecting filter (12) is coated on one side and another laser reflecting filter (14) is coated on the opposite side of an absorbing substrate (16) as depicted in FIG. 4, to minimize high power laser light from reaching an eye through both the substantial reflectance in the laser reflecting filter and the substantial absorption in the absorbing lens. In the case of a user wearing glasses, the substrate is typically shaped as a lens which typically has a spherical radius of curvature of 20 to 200 mm for both surfaces of the lens. A substantial radius of curvature, typically less than 200 mm, is also useful in this regard as it causes any reflected beam to diverge and linearly decreases the power density of the reflected beam with distance. In particular, a laser reflecting filter is deposited on both sides of an absorbing lens wherein the said coated lens is placed in front of a user's eye in order to substantially minimize the intensity of laser light incident upon the said eye so that the functionality of the said eye is not impaired, wherein the said two laser reflecting filters are optical filters designed to substantially reflect one or more laser lines while substantially transmitting most of the non-laser wavelengths in the visible spectrum from around 380 nm to around 780 nm, wherein the said absorbing lens substantially absorbs light at one or more laser line wavelengths while substantially transmitting most of the non-laser wavelengths in the visible spectrum from around 380 nm to around 780 nm, resulting in an enhancement of absorption of the said incident laser wavelengths by reflecting the light multiple times through the absorbing lens. This enhanced absorption through multiple reflections in a absorbing substrate relies on both laser reflecting filters reflecting a given laser line. For example, if a laser reflector filter on side 1 of a substrate reflects 532 nm and 635 nm and a laser reflecting filter on side 2 of a substrate reflects 532 nm only, then only the 532 nm laser light is reflected multiple times through the absorbing substrate and only the 532 nm laser light has an enhanced absorption. The said laser reflecting filters are designed to substantially reflect laser light centered at or around, but not restricted to, one or more of the following wavelengths of 405 nm, 445 nm, 532 nm, 635 nm, 650 nm, 808 nm and 1064 nm while the said absorbing lens substantially absorbs laser light centered at or around, but not restricted to, the following wavelengths of 405 nm, 445 nm, 532 nm, 635 nm, 650 nm, 808 nm and 1064 nm. A variation on this embodiment is that the laser reflecting filter that has the highest overall reflection is deposited on the side of the said absorbing substrate farthest from the user's eye in order to minimize the reflection of laser light or ambient light that is first incident upon the side of the said absorbing substrate that is closest to the user's eye. This helps to provide higher contrast for a user and minimize reflections of ambient light that can be distracting as mentioned previously.

In addition, the coated absorbing lens can be oriented such that the laser reflecting filter with the lowest overall reflectance is deposited on the side of the said absorbing lens closest to the user's eye in order to substantially reflect the said incident laser light wavelengths and have this reflected light pass through the absorbing substrate a second time in order to minimize the total intensity of laser light that is reflected away from the coated absorbing substrate. This helps to ensure that the intensity of the total reflected laser light off the said coated absorbing lens will be minimized to avoid harming the eyes of nearby people. For some applications, it is required that the substrate be made of a plastic material, such as a polycarbonate, in order to have it pass an impact projectile test and possibly also for lighter weight compared to a glass substrate.

Figure 7:
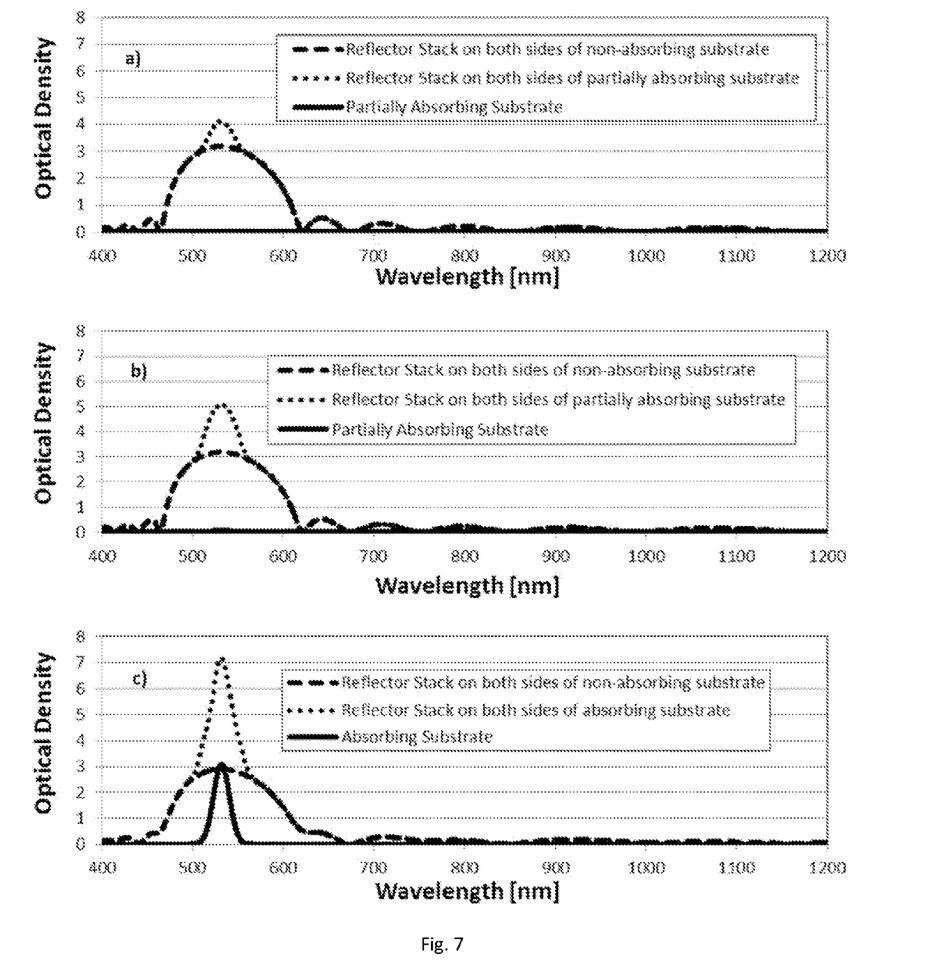
FIG. 7 shows the OD plotted against wavelength for a non-coated absorbing lens with a high absorption at 532 nm (solid line), and the same absorbing lens with a laser reflecting filter coated on both surfaces (dotted line) and the same laser reflecting filters coated on both surfaces of a non-absorbing lens (dashed line).

FIG. 7 shows an example of the embodiment of a laser reflecting filter deposited on both sides of an absorbing substrate whose structure corresponds to that depicted in FIG. 4. The solid line shows the optical density corresponding to an uncoated absorbing substrate; at a wavelength of ~532 nm, the incident laser light is blocked to a level of 3.1 OD. The optical density at a wavelength of ~532 nm that corresponds to laser reflecting filters deposited on both sides of a non-absorbing (dashed line) and absorbing (dotted line) is 2.8 OD and 7.2 OD, respectively. If there was no enhanced absorption (as is the case with the non-absorbing substrate), additive blocking of the absorbing substrate alone and the two laser reflecting filters on a non-absorbing substrate would have predicted a total blocking of 3.1 OD+2.8 OD=5.9 OD. However, because of the enhanced absorption effect, resulting from the laser reflecting filters causing multiple passes through the absorbing substrate, there is an additional 1.3 OD level of blocking that occurs in this example. To achieve the same level of blocking without the effect of enhanced absorption (as in the case of a structured depicted in FIG. 3), a number of additional layers would have to be incorporated into the laser reflecting filter.

In all of these above embodiments, the substantial transmittance of the coated substrate allows a relatively high overall transmittance of non-laser wavelength light over the spectral range of interest. For coated lenses used to protect an eye from high power lasers, this allows a user to wear the coated lenses in different ambient light conditions and still be able to carry out their duties (i.e., airline cockpit at night).

Example

Three examples are provided that demonstrate some of the above embodiments using laser reflecting filters. In the examples provided, the laser reflector filters were designed using alternating layers of a low index material of $SiO_2$ and a high index material of $Nb_2O_5$. A sputtering process was used to deposit the laser reflecting filters although other deposition methods could also be used. In addition, the deposition growth was optically monitored to determine that the desired layer thicknesses were deposited accurately; however, other monitoring methods could also be used (including depositing the laser reflecting filters based on time alone using known deposition rates).

Figure 8:
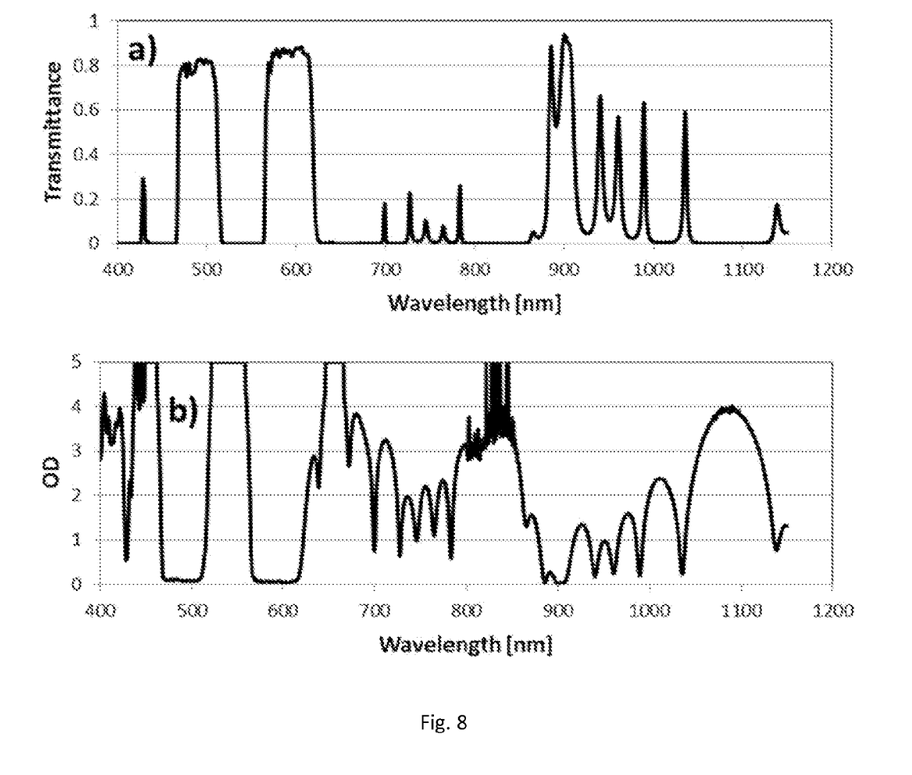
FIG. 8 shows by way of an example the measured a) transmittance and b) OD plotted against wavelength of a non-absorbing lens coated with a laser reflecting filter that has substantial high reflectance at the laser wavelengths of 405, 445, 532, 635, 650, 808 and 1064 nm, for an angular field of view of 30° and having substantial transmittance in the visible spectrum from 400 to 700 nm.

In a first example, a non-absorbing plastic (polycarbonate) lens and fused silica glass flat substrates are coated on one side only with a laser reflecting filter designed to substantially reflect laser light centered at or around of 405 nm, 445 nm, 532 nm, 635 nm, 650 nm, 808 nm and 1064 nm. This laser reflecting filter consisted of a total of 88 layers and a total metric thickness of 8.5 µm. After deposition, this laser reflected coated substrate was measured at a normal angle of incidence and the measured transmittance and optical density is shown in FIGS. 8a) and 8b), respectively. As can be seen in FIG. 8b), the blocking is greater than 3 OD below 400 nm (UVA/UVB protection) for the polycarbonate lens; for both substrates there is a high optical density (>2-3 OD) at the laser wavelengths of 405 nm, 445 nm, 532 nm, 635 nm, 808 nm and 1064 nm. In addition, as shown in FIG. 8a), this laser reflecting filter is substantially transmitting at wavelengths between the visible laser reflecting lines (i.e., two wavelength bands centered around 500 and 600 nm having a transmittance greater than 70%).

Figure 9:
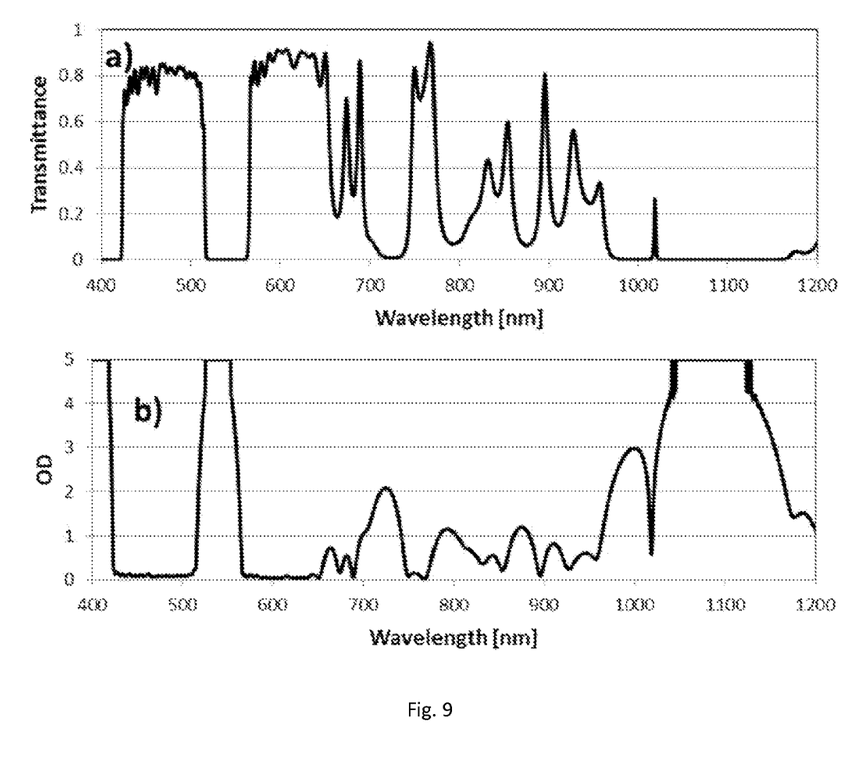
FIG. 9 shows by way of an example the measured a) transmittance and b) OD plotted against wavelength of a non-absorbing lens coated with a laser reflecting filter that has substantial high reflectance at the laser wavelengths of 532 and 1064 nm for an angular field of view of 30° and having substantial transmittance in the visible spectrum from 400 to 700 nm.

In a second example, a non-absorbing plastic (polycarbonate) lens and fused silica glass flat substrates are coated on one side only with a laser reflecting filter designed to substantially reflect laser light centered at or around of 532 nm and 1064 nm. This laser reflecting filter consisted of a total of 79 layers and a total metric thickness of 6.6 µm. After deposition, this laser reflected coated substrate was measured at a normal angle of incidence and the measured transmittance and optical density is shown in FIGS. 9a) and 9b), respectively. As can be seen in FIG. 9b), the blocking is greater than 5 OD below 400 nm (UVA/UVB protection) for the polycarbonate lens; for both substrates there is a high optical density (>4 OD) at the laser wavelengths of 532 nm and 1064 nm. In addition, as shown in FIG. 9a), this laser reflecting filter is substantially transmitting in the visible spectral range outside the 532 nm reflecting band (i.e., from 425 to 510 nm and from 580 to 650 nm where the transmittance is greater than 70%).

Figure 10:
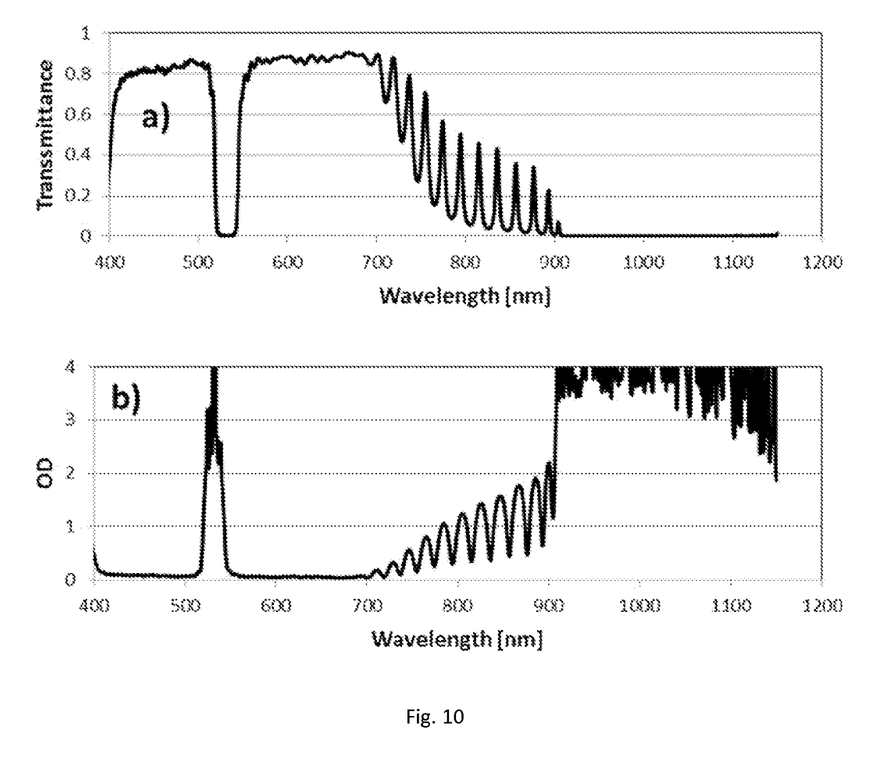
FIG. 10 shows by way of an example the measured a) transmittance and b) OD plotted against wavelength of a non-absorbing lens coated with a laser reflecting filter that has substantial high reflectance at the laser wavelengths of 532 and 1064 nm but allows for good discrimination between orange and yellow colours at the expense of the blocking level for an angular field of view of 30° and having substantial transmittance in the visible spectrum from 400 to 700 nm.

In a third example, a non-absorbing glass lens and fused silica glass flat substrates are coated on one side only with a laser reflecting filter designed to substantially reflect laser light centered at or around of 532 nm and 1064 nm. This filter consisted of a total of 67 layers and a total metric thickness of 8.7 µm. This laser reflecting filter was designed to especially provide good orange/yellow colour discrimination compared to the laser reflecting filter in the second example described above. After deposition, this laser reflected coated substrate was measured at a normal angle of incidence and the measured transmittance and optical density is shown in FIGS. 10a) and 10b), respectively. As can be seen in FIG. 10b), the blocking is greater than 2 OD at the laser wavelength of 532 nm and greater than 3 OD at 1064 nm. In addition, as shown in FIG. 10a), this laser reflecting filter is substantially transmitting in the visible spectral range outside the 532 nm reflecting band (i.e., from 405 to 505 nm and from 550 to 700 nm where the transmittance is greater than 70%). As can be seen, the improved orange/yellow discrimination is at the expense of a lower blocking level of the 532 nm laser line and a reduced angle of incidence range compared to the laser reflector in the second example.

As demonstrated by way of these examples, all the other embodiments can be realized in a similar manner by coating laser reflecting filters on one or both sides of a non-absorbing or absorbing substrate and the substrates can be curved similar to a glass eye lens or flat with parallel sides. The laser reflected coated fused silica glass (flat) substrates in the above examples could be used to protect a device such as a surveillance camera while the laser reflected coated lens could be used to protect a user's eyes.

The invention claimed is:

1. A laser protective device in the form of an article selected from the group consisting of: eyeglasses, an eyeshade and a lens adapted to be placed over a surveillance camera, comprising:
   a transparent substrate; and
   a multi-layer laser reflecting filter based on optical interference deposited on a rear or both sides of the transparent substrate configured to substantially reflect at least two laser wavelengths while substantially transmitting non-laser wavelengths in a given spectral range, and
   wherein the multi-layer laser reflecting filter is deposited directly on said rear or both sides of the substrate, the multi-layer laser reflecting filter(s) substantially reflects laser light in wavelength bands centered at or around at least two of the following laser wavelengths; 405 nm, 445 nm, 532 nm, 635 nm, 650 nm, 808 nm and 1064 nm, said wavelength bands encompassing spectral shift occurring between 0° and 30° angles of incidence, and transmits a major portion of the wavelengths outside the wavelength bands, and wherein when said protective device is in the form of eyeglasses or any eyeshade, said given range is from 380 nm to 780 nm and when said protective device is in the form of a lens adapted to be placed over a surveillance camera, said given range is from 200 nm to 1200 nm, and wherein the multi-layer laser reflecting filter deposited on the rear side of the transparent substrate incorporates as one of the layers thereof at least one absorbing layer to reduce ambient light directly reflected off the rear side of the transparent substrate.

2. A laser protective device claimed in claim 1, wherein said substrate is substantially absorbing at one or more said laser wavelengths while being substantially transmitting for said non-laser wavelengths over the given spectral range.

3. A laser protective device as claimed in claim 1, wherein said substrate is an absorbing substrate and said laser reflecting filters are optical filters deposited on both sides of said absorbing substrate.

4. A laser protective device as claimed in claim 1, wherein said a thin film reflecting filters are deposited on both sides of said substrate and a set of two or more said laser wavelengths reflected by said thin film reflecting filter on the rear side of said transparent substrate is different from a set of two or more said laser wavelengths reflected by said thin film reflecting filter on a front side of said transparent substrate.

5. A laser protective device as claimed in claim 1, which is in the form of eyeglasses or an eye shade configured for placement in front of a user's eye or eyes.

6. A laser protective device as claimed in claim 5, wherein said substrate is a lens with a spherical curvature, and wherein the radius of curvature of both sides of the lens lies in the range of 20 to 200 mm.

7. A laser protective device as claimed in claim 5, wherein said substrate is polycarbonate.

8. A laser protective device as claimed in claim 5, wherein said substrate is an absorbing substrate and said laser reflecting filter is deposited on the rear side only of said absorbing substrate.

9. A laser protective device as claimed in claim 8, wherein said absorbing substrate is a lens with a spherical curvature and the radius of curvature of both sides of the lens lies in the range 20 to 200 mm.

10. A surveillance camera used to view or monitor a scene or record images of a scene either continuously or intermittently, having a laser protective device mounted in front thereof, said laser protective device, comprising:
a transparent substrate; and
a multi-layer laser reflecting filter based on optical interference deposited on a rear or both sides of the transparent substrate configured to substantially reflect one or more laser wavelengths while substantially transmitting most non-laser wavelengths in a given spectral range, and
wherein the multi-layer laser reflecting filter is deposited directly on said rear or both sides of the substrate, the multi-layer reflecting filter(s) substantially reflects laser light in wavelength bands centered at or around at least two of the following laser wavelengths: 405 nm, 445 nm, 532 nm, 635 nm, 650 nm, 808 nm and 1064 nm, said wavelength bands encompassing spectral shift occurring between 0° and 30° angles of incidence, and transmits a major portion of the wavelengths outside the wavelength bands, wherein said given range is from 200 nm to 1200 nm, and wherein the multi-layer laser reflecting filter deposited on the rear side of the transparent substrate incorporates as one of the layers thereof at least one absorbing layer to reduce ambient light directly reflected off the rear side of the transparent substrate.

11. A surveillance cameras as claimed in claim 10, wherein the substrate is an absorbing substrate and the thin film reflecting filter is deposited on both sides of said absorbing substrate.

12. Protective eyewear, comprising:
a transparent substrate providing a viewing window; and
a multi-layer laser reflecting filter deposited on the rear or both sides of the transparent substrate configured to substantially reflect at least two laser wavelengths while substantially transmitting non-laser wavelengths in a given spectral range, and
wherein the multi-layer laser reflecting filter is deposited directly on said rear or both sides of the substrate, the multi-layer laser reflecting filter(s) substantially reflects laser light in wavelength bands centered at or around at least two of the following laser wavelengths: 405 nm, 445 nm, 532 nm, 635 nm, 650 nm, 808 nm and 1064 nm, said wavelength bands encompassing spectral shift occurring between 0° and 30° angles of incidence, and transmits a major portion of the wavelengths outside the wavelength bands, and wherein said given range is from 380 nm to 780 nm, and wherein the multi-layer laser reflecting filter deposited on the rear side of the transparent substrate incorporates as one of the layers thereof at least one absorbing layer to reduce ambient light directly reflected off the rear side of the transparent substrate.

13. Protective eyewear as claimed in claim 12, wherein the transparent substrate decreases the total amount of light entering the eye to provide against at least one of UVA/UVB light.

14. Protective eyewear as claimed in claim 12, wherein the wherein the protective substrate is made of polycarbonate.

15. Protective eyewear as claimed in claim 12, wherein the substrate is an absorbing substrate and the thin film reflecting filter is deposited on both sides of said absorbing substrate.

* * * * *